United States Patent Office 2,982,672
Patented May 2, 1961

2,982,672
METHOD OF TREATING A GLASS SURFACE WITH AN ALKYL PHENOXY POLYOXYETHYLENE ETHANOL AND ARTICLE PRODUCED THEREBY

Thomas R. Santelli, Toledo, Ohio, assignor to Owens-Illinois Glass Company, a corporation of Ohio No Drawing. Filed May 6, 1957, Ser. No. 657,033

8 Claims. (Cl. 117—124)

This invention relates to a new compound useful in the treating of glass surfaces, and, more particularly to a method for coating the surfaces of glass containers with such a compound to substantially permanently improve their lubricity, water-repellency and label adhesion characteristics.

During the manufacture of glass containers, glassware and the like, it is customary to provide a protective coating or film on the surfaces thereof for the purpose of imparting a lubricity characteristic thereto so that scratching caused by glass-to-glass contact is reduced or even avoided completely during inspection, packaging and customer handling of the articles. Coating such glassware in this manner also results in the reduction in the amount of off-ware, less breakage in packing and shipping and less breakage during customer handling. It is further believed that there is an increase in the strength characteristics of the glass article due to such surface treatments, including the healing of scratches or imperfections that are present due to the handling operation at the hot-end of the unit operation.

Among known coating compounds giving satisfactory results and which are in commercial use are included certain silicones and polyethylenes. However, these have certain disadvantages, one of which is that they can only be applied in emulsion form. Besides the problem of emulsion stability, which is always present, there are many instances wherein such emulsions plug the spray lines of the particular apparatus used for the treatment of the glass surfaces. Furthermore, there is always the danger of toxicity to the operator from the formation of copper oleate due to the reaction of the emulsifier (usually morpholine oleate) with the copper tubing commonly used in the apparatus. Another factor in the use of the silicones, and the polyethylenes to some extent, is their tendency to migrate and prevent the adherence of gummed labels to the surface of the coated glass under varying conditions.

While water soluble compounds are thus preferred and have been used for coating the surfaces of glass containers and glassware during their manufacture, including a water solution of MYRJ 52-S, a polyoxyethylene stearate sold by the Atlas Chemical Company and having the formula:

$$CH_3(CH_2)_{16}-\underset{\underset{O}{\|}}{C}(OCH_2CH_2)_nOH$$

wherein $n=40$, these compounds have the disadvantage of being quickly and easily removed by a simple washing of the glass surface and thus do not furnish an adequate and permanent protective coating on the glass surface.

Accordingly, it is an object of this invention to obviate the disadvantages which exist in using the known aforementioned compounds for treating the surfaces of glass containers, glassware and the like during their manufacture by the process illustrated in the following flow-diagram

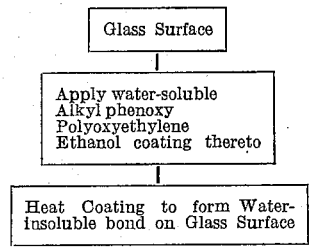

Another object of this invention is to provide a coating on the surfaces of glass containers, glassware and the like to vastly improve the lubricity and water-repellency characteristics of the treated glass surface.

Still another object of this invention is to provide a new and useful compound as a coating on a glass surface, such as glassware, glass containers and the like, onto which gummed labels may be affixed and securely held in place even when such surfaces are subjected to abnormal conditions.

In attaining the objects of this invention one feature resides in applying to the surface of a glass container a coating comprising a para-substituted phenoxy polyoxyethylene ethanol. Another feature of the invention resides in treating the surface of a glass container with the water soluble reaction product of an ethylene oxide with an alkyl phenol and applying heat to the treated surface so as to make the coating thereon substantially permanent.

Other objects, features and advantages of the invention will become more readily apparent from the following disclosure.

It has been noted that glass surfaces which have been coated with the water soluble reaction product of an ethylene oxide and an alkyl phenol have had imparted thereto improved lubricity, label adhesion and water-repellency characteristics after the coating has been subjected to heat for a predetermined period of time.

Alkyl phenoxy polyoxyethylene ethanols, the reaction products of an ethylene oxide and an alkyl phenol, are compounds manufactured and sold by General Aniline and Film Corporation, New York, New York under the trademark "Igepal" and particularly under the trademarks "Igepal CA," "Igepal CO" and "Igepal DM." These include a series of nonionic surfactants having the structural formula

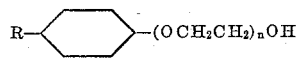

wherein R is an octyl, nonyl or higher alkyl respectively, and $n$ denotes the moles of ethylene oxide which have been reacted therewith. The mole ratio of ethylene oxide can be varied over a wide range and good water-repellency may be obtained from such ethanols in which the ethylene oxide to alkyl phenol ratio is 1 to 1, 100 to 1 or even greater. The important feature is that the alkyl phenoxy polyoxyethylene ethanols be water soluble so that they may be applied in aqueous solutions, such as for example by spraying, onto a glass surface. By the subjecting of the coated glass to heat, the coating becomes substantially permanent and exhibits the desired properties specified, supra.

The prepared range of concentration for an aqueous solution of alkyl phenoxy polyoxyethylene ethanol for commercial application by the spray method is between 0.01% to 1%. Since the effective concentration of such coating compound to be applied to a glass surface is related to the amount of material deposited per unit of surface area, it is conceivable that one could apply equally effective coatings by use of a 0.01% concentrated solution or a solution of 100% strength depending upon the method of application and the temperature at which the coating is baked.

Excellent results have been obtained where eight to nine moles of ethylene oxide have been reacted with one mole of an alkyl phenol to form the coating compound, alkyl phenoxy polyoxyethylene ethanol, while the alkyl preferably is either an octyl, nonyl or higher alkyl radical, it could also be a lower radical such as a butyl radical.

However, it is not necessary to so limit R in the formula to a particular alkyl or groups of alkyl. Instead R can also be an aromatic, alicyclic, heterocyclic and the like radical and the ethanol may probably be best defined as a para-substituted phenoxy polyoxyethylene ethanol. Again, the important feature is that such ethanols be water soluble.

A specific example of a para-substituted phenoxy polyoxyethylene ethanol is Igepal CA-630, a non-ionic liquid surfactant manufactured and sold by the General Aniline and Film Corporation, and which is formed by the reaction of eight to nine moles of ethylene oxide with one mole of octyl phenol. The aforesaid ethanol is a polyoxyethylated octyphenol having the formula

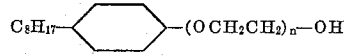

wherein $n$ denotes the mole ratio of ethylene oxide and is 8 to 9. When this reaction product is applied to a glass surface in a weak solution, such as a 0.05% solution, to form a coating thereon and the treated surface is subjected to heat, a substantially permanent coating is formed on the glass surface. Such a coating has improved properties with respect to lubricity, label adhesion, and water-repellency.

A number of tests were conducted with a 0.05% water solution of octyl phenoxy polyoxyethylene ethanol wherein the polyoxyethylene group is composed of eight to nine units of ethylene oxide. A number of glass slides were coated with this particular compound which was then baked onto the glass surface at 302° F. for a period of thirty minutes. Each of the slides was then tested for water-repellency, for lubricity and for label adhesion. The results are shown on Tables I, II and III respectively.

TABLE I

*Data for contact angle test*

| Number | Coating Process Time—Temp. | Treatment | Before/After |
|---|---|---|---|
| 1 | 30′ at 302° F | Cold Water (60′) | 35/22 |
| 2 | do | do | 35/21 |
| 3 | do | do | 36/30 |
| 4 | do | 150° F. Water (30′) | 70/36 |
| 5 | do | do | 57/37 |
| 6 | do | do | 55/32 |
| 7 | do | 212° F. Water (20′) | 56/11 |
| 8 | do | do | 50/17 |
| 9 | do | do | 41/11 |
| 10 | do | 240° F. Water (60′) | 44/21 |
| 11 | do | do | 41/18 |
| 12 | do | do | 47/16 |
| 13 | do | 150° F.—3% NaOH (10′) | 51/17 |
| 14 | do | do | 47/10 |
| 15 | do | do | 43/8 |
| 46 | 30′ at 347° F | 212° F. Water (20′) | 39/35 |
| 47 | do | do | 41/39 |
| 48 | do | do | 40/40 |
| 52 | 30′ at 392° F | do | 29/36 |
| 53 | do | do | 28/34 |
| 54 | do | do | 31/37 |
| 73 | 30′ at 347° F | do | 44/39 |
| 74 | do | do | 37/34 |
| 75 | do | do | 34/33 |

TABLE II

*Data for lubricity test*

| Number | Coating Process Time—Temp. | Treatment | Before/After |
|---|---|---|---|
| 16 | 30′ at 302° F | Cold Water (60′) | 11/11 |
| 17 | do | do | 12/12 |
| 18 | do | do | 12/14 |
| 19 | do | 150° F. Water (30′) | 12/13 |
| 20 | do | do | 12/13 |
| 21 | do | do | 13/13 |
| 22 | do | 212° F. Water (20′) | 12/10 |
| 23 | do | do | 13/9 |
| 24 | do | do | 13/9 |
| 25 | do | 240° F. Water (60′) | 13/15 |
| 26 | do | do | 12/14 |
| 27 | do | do | 12/15 |
| 28 | do | 150° F.—3% Caustic (10′) | 12/9 |
| 29 | do | do | 12/10 |
| 30 | do | do | 13/10 |
| 49 | 30′ at 347° F | 212° F. Water (20′) | 10/10 |
| 50 | do | do | 10/11 |
| 51 | do | do | 9/11 |
| 55 | 30′ at 392° F | do | 11/13 |
| 56 | do | do | 11/13 |
| 57 | do | do | 12/14 |
| 70 | 30′ at 347° F | do | 13/13 |
| 71 | do | do | 14/11 |
| 72 | do | do | 13/10 |

TABLE III

*Data for label adhesion test*

| Number | Coating Process Time—Temp. | Treatment | Before/After |
|---|---|---|---|
| 31 | 30′ at 302° F | Cold Water (60′) | 0/0 |
| 32 | do | do | 0/0 |
| 33 | do | do | 0/0 |
| 34 | do | 150° F. Water (60′) | 0/0 |
| 35 | do | do | 0/0 |
| 36 | do | do | 0/0 |
| 37 | do | 212° F. Water (20′) | 0/0 |
| 38 | do | do | 0/0 |
| 39 | do | do | 0/0 |
| 40 | do | 240° F. Water (60′) | 0/0 |
| 41 | do | do | 0/0 |
| 42 | do | do | 0/0 |
| 43 | do | 150° F.—3% NaOH (10′) | 0/0 |
| 44 | do | do | 0/0 |
| 45 | do | do | 0/0 |

The water-repellency of the treated slides were measured as follows: Each of the treated slides was partially immersed in a container of distilled water. Starting with the specimen in a vertical position, it was rotated at a uniformly slow rate so that the angle between the treated surface of the specimen and the surface of the water was increased. The rotation was continued until the water no longer formed a meniscus on the treated surface. The angle between the immersed, treated surface and the surface of the water was measured. This is the contact angle and it is known that the greater the contact angle, the better the water-repellency of the particular treated surface.

A study of Table I, supra, shows that there is a decrease in contact angle when the coated specimens, which have been heated to 302° F. for 30 minutes after coating, are subjected to either cold or hot water or 3% NaOH for a short period of time. However, it is surprising to note that specimens which have been coated and heated to a temperature of 347° F. for 30 minutes substantially retain their water-repellency, as measured by the contact angle, when further subjected to boiling water for 20 minutes. (See Examples 46 to 48 and 73 to 75, Table I.) It is further surprising to note that if the specimens are heated to a temperature of 392° F. for 30 minutes after coating and then placed in boiling water for twenty minutes, there is a substantial increase in the water-repellency of the specimens. (See Examples 52–54, inclusive, Table I.)

Treated specimens were measured for lubricity as follows: A square (1″ x 1″) of clean glass weighted to 200 grams is placed at one end of a treated specimen. That end is raised uniformly and slowly until the weighted square slides the complete length of the specimen.

The angle, from the horizontal, of the specimen is then measured. This is the lubricity angle and the smaller the angle the better the lubricity of the specimen.

From the data on Table II it is readily apparent that further treatment of the coated specimens either has no substantial effect on the lubricity of the specimens or, under certain conditions, this further treatment actually improves the lubricity.

The gummed label adhesion test for each treated specimen was conducted as follows: A strip of ordinary gummed paper 1″ x 2″ was glued to a treated specimen so that an area of 1 square inch of the treated surface is covered. After conditioning the specimens, the label is torn off by means of the protruding portion. The approximate area of adhering label is then measured.

As shown in Table III, the gummed labels always adhere to the coated surfaces and not even a minor portion of the adhering label is removed by this test.

The results of the tests of Tables I, II and III have been summarized in Table IV.

TABLE IV

*Summary of test data before treatment/after treatment*

| Test | Treatment | Coating Process, Time—Temp. | Average |
|---|---|---|---|
| Contact Angle | Cold Water (60′) | 30′ at 302° F | 35/23 |
| Do | 150° F. Water (30′) | do | 61/35 |
| Do | 212° F. Water (20′) | do | 49/13 |
| Do | 240° F. Water (60′) | do | 44/18 |
| Do | 3% NaOH—150° F. (10′) | do | 47/12 |
| Lubricity | Cold Water (60′) | do | 12/12 |
| Do | 150° F. Water (30′) | do | 12/13 |
| Do | 212° F. Water (20′) | do | 13/9 |
| Do | 240° F. Water (60′) | do | 12/15 |
| Do | 150° F.—3% NaOH (10′) | do | 12/10 |
| Label Adhesion | Cold Water (60′) | do | O/O |
| Do | 150° F. Water (30′) | do | O/O |
| Do | 212° F. Water (20′) | do | O/O |
| Do | 240° F. Water (60′) | do | O/O |
| Do | 150° F.—3% NaOH (10′) | do | O/O |
| Contact Angle | 212° F. Water (20′) | 30′ at 347° F | 40/38 |
| Lubricity | do | do | 10/11 |
| Contact Angle | do | 30′ at 392° F | 29/36 |
| Lubricity | do | do | 11/13 |
| Contact Angle | do | 30′ at 347° F | 38/35 |
| Lubricity | do | do | 13/11 |

Further tests were conducted with slides coated with a 0.05% water solution of octyl phenoxy polyoxyethylene ethanol wherein the polyethylene group was composed of eight to nine units of ethylene oxide and subjected to a temperature of 302° F. for 30 minutes. The results with respect to water-repellency, lubricity and label adhesion were compared with the results obtained by using various silicones and polyethylene coatings on similar slides and a summary of the test data before and after further treatment are set forth in Table V.

XEF–4010, produced by Dow Corning Corporation is a 35% silicone water dilutable emulsion obtained by the cohydrolysis of methyl and dimethyl chlorosilanes.

SM–70, produced by the General Electric Company is a 50% silicone water dilutable emulsion also obtained by the cohydrolysis of methyl and dimethyl chlorosilanes.

AC–629 and AC "M," produced by Allied Chemical and Dye Corporation (Semet Solvay Petrochemical Division), are oxidized polyethylenes having an average molecular weight of about 2,000, a low acid number and only traces of saponifiable material.

From an examination of Table V it may be observed that the coating compounds of this invention, when compared to the silicone coatings, impart a comparable lubricity, considerably better label adhesion, but less water-repellency to the treated surface. The latter characteristic may be improved by baking the compound onto the glass surface at a temperature of 347° F. for a period of 30 minutes. When the results of the coating compound of this invention are compared with the polyethylene coatings, the glass surfaces treated with the former appear to be equivalent in lubricity, better in label adhesion and substantially equivalent in water resistance.

Slides treated with the compounds of this invention retain their coating even after they have been subjected to the various treatments shown in the above tables. This fact is demonstrated by a water peel test conducted with the slides of Examples 1 to 15, inclusive, of Table I. The results of this test have been incorporated in Table VI.

TABLE VI

*Water peel quality vs. contact angle*

| Number | Treatment | Contact Angle Before/After | Water Peel After Treatment [1] |
|---|---|---|---|
| 1 | Cold Water (60′) | 35/22 | VG |
| 2 | do | 35/21 | F |
| 3 | do | 36/30 | VG |
| 4 | 150° F. Water (30′) | 70/36 | VG |
| 5 | do | 57/37 | VG |
| 6 | do | 55/32 | VG |
| 7 | 212° F. Water (20′) | 56/11 | VG |
| 8 | do | 50/17 | VG |
| 9 | do | 41/11 | VG |
| 10 | 240° F. Water (60′) | 44/21 | F |
| 11 | do | 41/18 | F |
| 12 | do | 47/16 | F |
| 13 | 158° F.—3% NaOH (10′) | 51/17 | F |
| 14 | do | 47/10 | F |
| 15 | do | 43/8 | F |

[1] E=Water drop runs off rapidly leaving no trail.
VG=Water drop runs off slowly leaving no trail.
G=Water drop runs off rapidly leaving a slight trail.
F=Water drop runs off slowly leaving a slight trail.
P=Water drop runs off slowly leaving a marked trail.
Uncoated slides rate P in his test.

TABLE V

*Summary of test averages before treatment/after treatment*

| Test | Treatment | Uncoated Control | XEF-4010 [1] | SM-70 [1] | AC "M" [1] | AC-629 [1] | Igepal CA-630 [1] |
|---|---|---|---|---|---|---|---|
| Contact Angle | Cold Water (60′) | 14/46 | 93/87 | 93/83 | 36/37 | 56/58 | 35/23 |
| | 150° F. Water (30′) | 14/31 | 83/75 | 87/80 | 28/25 | 50/58 | 61/35 |
| | 212° F. Water (20′) | 10/17 | 94/48 | 84/56 | 27/16 | 52/48 | 49/13 |
| | 240° F. Water (60′) | 8/8 | 93/44 | 101/38 | 46/15 | 60/18 | 44/18 |
| | 150° F.—3% NaOH (10′) | 15/10 | 91/55 | 100/37 | 44/15 | 53/33 | 47/12 |
| Lubricity | Cold Water (60′) | 23/13 | 9/9 | 9/9 | 17/13 | 9/9 | 12/12 |
| | 150° F. Water (30′) | 20/16 | 9/10 | 9/8 | 20/13 | 10/13 | 12/13 |
| | 212° F. Water (20′) | 18/17 | 9/10 | 10/10 | 18/13 | 10/13 | 13/9 |
| | 240° F. Water (60′) | 18/16 | 8/15 | 9/22 | 21/13 | 11/12 | 12/15 |
| | 150° F.—3% NaOH (10′) | 23/19 | 9/12 | 8/9 | 19/11 | 9/12 | 12/10 |
| Label Adhesion | Cold Water (60′) | O/O | X/X | X/X | X/X | P/P | O/O |
| | 150° F. Water (30′) | O/O | X/X | X/X | X/X | X/X | O/O |
| | 212° F. Water (20′) | O/O | X/P | X/X | X/X | X/O | O/O |
| | 240° F. Water (60′) | O/O | X/O | X/O | X/O | X/O | O/O |
| | 150° F.—3% NaOH (10′) | O/O | X/O | X/O | X/O | X/O | O/O |

[1] =Silicones applied in 1% concentration. Polyethylenes applied in 0.1% concentration. Igepal applied in 0.05% concentration, baked 30′, 302° F.
O=Label adhered.
P=Part of label adhered.
X=Label did not adhere.

In the water peel test, the treated slide is held almost vertical and a drop of water is placed on its surface near the upper end. The manner in which the drop runs off is noted. The data from this test indicates that the alkyl phenoxy polyoxyethylene ethanol affords water resistant properties to the glass surface even after the slides have been subjected to the treatments illustrated in Table I.

While the extensive tests illustrated in the above tables were conducted with a 0.05% aqueous solution of octyl phenoxy polyoxyethylene ethanol, excellent results were also obtained with the use of a water-soluble nonyl phenoxyethylene ethanol. The results, compared to those obtained with the octyl phenoxy polyoxyethylene ethanol, at various concentrations, are set forth in Table VII.

TABLE VII

Comparison octyl to nonyl phenoxy polyoxyethylene ethanol wherein the polyoxyethylene group consists of 8 to 9 units of ethylene oxide.

| Conc., Percent | Cure | 20 Minute Treatment | Contact Angle | | | | Lubricity | | | |
|---|---|---|---|---|---|---|---|---|---|---|
| | | | Octyl | | Nonyl | | Octyl | | Nonyl | |
| | | | B* | A* | B* | A* | B* | A* | B* | A* |
| 0.05 | 10'-175° C | boiling water | 28 | 25 | 27 | 20 | 14 | 11 | 14 | 11 |
| 0.10 | 10'-175° C | do | 29 | 27 | 31 | 28 | 12 | 14 | 11 | 14 |
| 0.10 | 10'-200° C | do | 16 | 21 | 19 | 20 | 13 | 12 | 13 | 13 |
| 0.05 | 30'-150° C | do | 49 | 13 | | | 13 | 9 | | |
| 0.05 | 30'-175° C | do | 40 | 38 | | | 10 | 11 | | |
| 0.05 | 30'-200° C | do | 29 | 36 | | | 11 | 13 | | |

B*—Before treatment.
A*—After treatment.

Having described the invention, what is claimed is:

1. The method of improving the lubricity, water-repellency and label adhesion properties of a glass surface comprising coating said surface with a water-soluble para-substituted phenoxy polyoxyethylene ethanol, and baking said coating onto said surface at a temperature sufficient to form a water-insoluble bond thereto.

2. The product made in accordance with the process defined in claim 1.

3. The method as defined in claim 1 wherein said ethanol is octyl phenoxy polyoxyethylene ethanol.

4. The method as defined in claim 1 wherein said ethanol is nonyl phenoxy polyoxyethylene ethanol.

5. The method of improving the lubricity, water-repellency and label adhesion properties of a glass surface comprising coating a 0.01% to 1% solution of a water-soluble alkyl phenoxy polyoxyethylene ethanol onto said surface and subjecting said surface to sufficient heat to bake said ethanol thereon at a temperature sufficient to form a water-insoluble bond thereto.

6. The method of improving the lubricity, water-repellency and label adhesion properties of a glass surface comprising spraying a 0.01% to 1% solution of a water-soluble octyl phenoxy polyoxyethylene ethanol onto said glass surface and subjecting said surface to sufficient heat to bake said coating thereon at a temperature sufficient to form a water-insoluble bond thereto.

7. The method of improving the lubricity, water-repellency and label adhesion properties of a glass surface comprising spraying a 0.01% to 1% solution of a water-soluble nonyl phenoxy polyoxyethylene ethanol onto said glass surface and subjecting said surface to sufficient heat to bake said coating thereon at a temperature sufficient to form a water-insoluble bond thereto.

8. The method of improving the lubricity, water-repellency and label adhesion properties of a glass surface comprising coating a 0.05% solution of a water-soluble alkyl phenoxy polyoxyethylene ethanol, wherein said alkyl is selected from the group consisting of octyl and nonyl, onto said glass surface and subjecting said coated surface to a temperature of approximately 302° F. to 392° F. for a period of approximately 30 minutes to form a water-insoluble bond thereto.

References Cited in the file of this patent

UNITED STATES PATENTS

| | | |
|---|---|---|
| 2,668,785 | Jefferson et al. | Feb. 9, 1954 |
| 2,729,576 | Trusler | Jan. 3, 1956 |
| 2,930,106 | Wrotnowski | Mar. 29, 1960 |